United States Patent [19]

Pulak

[11] 4,032,299

[45] * June 28, 1977

[54] SPENT CATALYST REGENERATION APPARATUS WITH INTERNAL REGENERATED-CATALYST RECYCLE MEANS

[75] Inventor: Richard P. Pulak, Palatine, Ill.

[73] Assignee: UOP Inc., Des Plaines, Ill.

[ * ] Notice: The portion of the term of this patent subsequent to Apr. 27, 1992, has been disclaimed.

[22] Filed: Mar. 15, 1976

[21] Appl. No.: 667,247

Related U.S. Application Data

[63] Continuation-in-part of Ser. No. 429,422, Dec. 28, 1973, Pat. No. 3,953,175.

[52] U.S. Cl. .................. 23/288 B; 23/288 S; 208/164; 252/417

[51] Int. Cl.² ................ B01J 8/08; B01J 8/18; B01J 37/14

[58] Field of Search .......... 23/288 B, 288 S, 288 E; 252/417; 208/164

[56] References Cited

UNITED STATES PATENTS

| 3,843,330 | 10/1974 | Connor et al. | 23/288 B |
|---|---|---|---|
| 3,844,973 | 10/1974 | Stine et al. | 23/288 B X |
| 3,893,812 | 7/1975 | Connor et al. | 23/288 B |
| 3,898,050 | 8/1975 | Strother | 23/288 B |
| 3,953,175 | 4/1976 | Pulak | 23/288 B |

*Primary Examiner*—Joseph Scovronek
*Attorney, Agent, or Firm*—James R. Hoatson, Jr.; Thomas K. McBride; William H. Page, II

[57] ABSTRACT

A catalyst regeneration apparatus for the oxidation of coke from a spent catalyst and for the conversion of carbon monoxide resulting from the oxidation of coke to carbon monoxide.

The apparatus comprises in combination and particular arrangement a spent-catalyst receiving chamber for containing a dense-bed of fluidized catalyst in which chamber spent catalyst is oxidized to produce regenerated catalyst and partially-spent regeneration gas; a transfer conduit through which partially-spent regeneration gas and regenerated catalyst pass and in which carbon monoxide is essentially completely converted to carbon dioxide to produce spent regeneration gas and regenerated catalyst at an increased temperature; a regenerated-catalyst receiving chamber for containing dense-bed of regenerated catalyst and in which spent regeneration gas and regenerated catalyst are separated; and, an internal regenerated-catalyst recycle means by which hot regenerated catalyst can be recycled from the transfer conduit to the spent-catalyst receiving chamber in amounts to increase the temperature and hence the rate of coke oxidation in the spent-catalyst receiving chamber.

4 Claims, 1 Drawing Figure

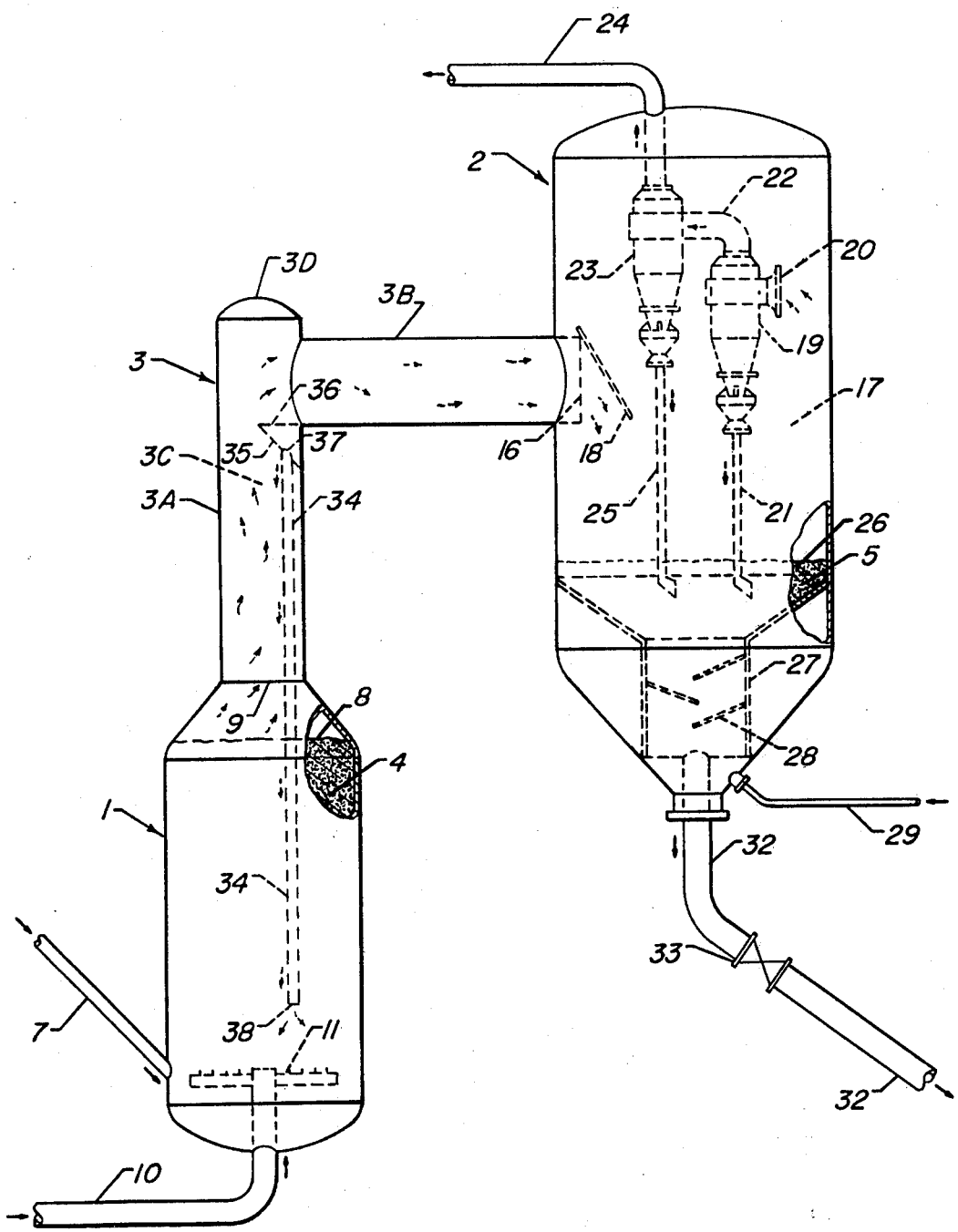

SPENT CATALYST REGENERATION APPARATUS WITH INTERNAL REGENERATED-CATALYST RECYCLE MEANS

CROSS-REFERENCE TO RELATED APPLICATIONS

This application is a continuation-in-part application of my prior copending application Ser. No. 429,422 filed Dec. 28, 1973 now U.S. Pat. No. 3,953,175, issued on Apr. 27, 1976 all of the teachings of which are incorporated herein by specific reference thereto.

BACKGROUND OF THE INVENTION

1. Field of the Invention

The field of art to which this invention pertains is catalyst regeneration apparatus. More specifically, the present invention relates to a regeneration apparatus which is applicable for use in regenerating fluidizable catalytic cracking catalyst which has become spent by deposition of coke thereon.

2. Description of the Prior Art

In most regeneration processes presently employed the oxidation of coke from spent catalyst is done in a single-vessel regeneration apparatus containing one or more dense beds located in the bottom of the apparatus with a large dilute-phase disengaging space positioned above and in connection with the dense bed. In this type of regeneration process the dense bed is maintained in the bottom portion of the apparatus by limiting the superficial velocity of the incoming fresh regeneration gas to transport velocity, that is, the velocity above which large amounts of catalyst would be carried out of the dense bed to the disengaging space. Typical velocities are therefore less than about 3 feet per second with 1.5 to 2.5 being the usual range. Provisions are made for recovering and returning to the dense bed any catalyst entrained in the flue gas effluent passing from the dense bed. This is generally carried out by passing this effluent flue gas containing entrained catalyst through separation means such as cyclone spearation devices located in the disengaging space and returning separated catalyst to the same dense bed. Average residence time of the catalyst within the apparatus per pass through the apparatus is generally in the 2 to 5 minute range with 2 to 3 minutes being the more common, while the residence time of gas is generally within the range of 10 to 20 seconds. All of the regenerated catalyst is returned directly from the regeneration apparatus to the reaction zone without additional passes through any part of the regeneration apparatus.

It is also present practice to operate conventional regeneration apparatus in a manner to preclude the essentially complete combustion of the CO that is produced by coke oxidation. This is generally done by controlling the oxygen-containing gas stream introduced to such regeneration apparatus directly responsive to a rather small predetermined temperature differential between the flue gas outlet or the disengaging space and the dense bed of the regeneration apparatus. Excess oxygen within the regeneration apparatus is thus minimized thereby severely limiting CO afterburning to only that amount characterized by the small temperature differential.

Since the conversion of CO to $CO_2$ is quite exothermic, this restricting of CO afterburning in conventional regeneration apparatus is done for the very practical reason of avoiding the damaging effects of excessively high temperatures in the upper disengaging space region of the regeneration apparatus where there is little catalyst present to act as a heat sink. This practice, as exemplified by Pohlenz U.S. Pat. Nos. 3,161,583 and 3,206,391, produces a small amount of oxygen in the flue gas, generally in the range of about 0.1 to 1% oxygen, results in the flue gas containing from about 7 to about 14 vol. % CO and limits the temperatures achieved in the regeneration apparatus to a maximum of about 1275° F. Present industry practice is to direct the flue gas containing CO to the atmosphere or to a CO boiler where it is used as fuel to make steam.

Controlling the amount of fresh regeneration as to permit a slight amount of afterburning and the once-through flow of catalyst through the regeneration apparatus essentially fixes the degree of catalyst regeneration, that is, the amount of residual coke on regenerated catalyst. Although it is widely known that the residual coke content on regenerated catalyst has a great influence on the conversion and the product distribution obtained from the hydrocarbon reaction zone, residual coke level on regenerated catalyst produced by present regeneration processes conducted in conventional regeneration apparatus is not an independent variable but is fixed by regeneration apparatus design at a level typically from about 0.05 to about 0.04 wt. % carbon, and more often from about 0.15 to about 0.35 wt. % carbon.

The apparatus of my invention provides for essentially complete combustion within the apparatus of the CO produced and for recovery within the apparatus of at least a portion of the heat of combustion. This is distinguished from conventional regeneration apparatus which permit only small limited amounts of CO afterburning with essentially no recovery of the potential chemical heat within the apparatus. My invention recognizes the differences in the kinetics of coke oxidation and CO oxidation and provides separate regions within the regeneration apparatus for each to take place. Coke is oxidized primarily in a dense bed of fluidized catalyst in the spent-catalyst receiving chamber to produce regenerated catalyst and partially-spent regeneration gas which are passed through a transfer conduit where essentially complete CO oxidation takes place to produce spent regeneration gas and where heat of combustion is transferred to the regenerated catalyst passing through that zone. An internal regenerated-catalyst recycle means is provided to return a portion of hot regenerated catalyst from the transfer conduit to the dense bed of catalyst in the spent-catalyst receiving chamber in amounts to increase the temperature and the density in the spent-catalyst receiving chamber thereby increasing both the rate and extent of coke oxidation. Additionally, the rate of CO burning in the transfer conduit is also increased because of the higher inlet temperature thereby producing lower CO concentrations in the spent regeneration gas leaving the apparatus. Spent regeneration gas and the remainder of the regenerated catalyst pass into a regenerated-catalyst receiving chamber, catalyst and gas are separated by separation devices and regenerated catalyst is directed to a dense bed in the bottom portion of the regenerated-catalyst receiving chamber. Regenerated catalyst from the regenerated-catalyst receiving chamber is returned to the hydrocarbon reaction zone at a temperature higher than that obtained in non-CO-burning regeneration zones thereby permitting reduced hydrocarbon feed preheat requirements.

SUMMARY OF THE INVENTION

It is, accordingly, a broad object of the present invention to provide a catalyst regeneration apparatus comprising a spent-catalyst receiving chamber, a transfer conduit, a regenerated-catalyst receiving chamber, and a regenerated catalyst recycle means uniquely and advantageously arranged to offer features not found in present regeneration apparatus.

More specifically, it is an object of the present invention to present a catalyst regeneration apparatus in which CO can be essentially completely converted to $CO_2$ in a manner in which at least a portion of the heat of combustion can be recovered and used within the apparatus. It is an additional object of my invention that most existing single vessel FCC regeneration apparatus shall be capable of being incorporated into my apparatus thus saving on construction cost.

My invention can be briefly summarized as a catalyst regeneration apparatus comprising in combination: (a) a spent-catalyst receiving chamber for containing a dense-phase fluidized bed of catalyst having a spent catalyst inlet means and a fresh-regeneration gas inlet means connected thereto to allow passage of spent catalyst and fresh regeneration gas respectively into said chamber and having a regenerated-catalyst/regeneration-gas outlet means connected thereto to allow passage of regenerated catalyst and regeneration gas from said chamber; (b) a transfer conduit positioned above said spent-catalyst receiving chamber and having a substantially vertical portion and a substantially horizontal portion in interconnection with said vertical portion, said vertical portion extending above said horizontal portion and having an inlet connected to the regenerated-catalyst/regeneration-gas outlet means and said horizontal portion extending into the side of a hereinafter described regenerated-catalyst receiving chamber and being provided with an outlet means into said chamber whereby regenerated catalyst and regeneration gas are carried from said spent-catalyst receiving chamber in admixture to said regenerated-catalyst receiving chamber, said portions of said transfer conduit being of sufficient internal volume to permit CO oxidation and transfer of the heat of combustion to said catalyst therein; (c) a regenerated-catalyst receiving chamber for containing a dense-phase bed of regenerated catalyst, said chamber having a regenerated-catalyst outlet means and a spent-regeneration-gas outlet means connected thereto to allow passage of regenerated catalyst and spent regeneration gas from said chamber; and, (d) an internal regenerated-catalyst recycle means, having an inlet means in the transfer conduit and an outlet means in the spent-catalyst receiving chamber, to allow passage of a portion of regenerated catalyst from the transfer conduit to the spent-catalyst receiving chamber.

Other embodiments and objects of the present invention encompass further details such as the function and arrangement of these various elements all of which are hereinafter disclosed in the following discussion of each of these facets of the invention.

DESCRIPTION OF THE DRAWING

Having thus described the apparatus of my invention in brief general terms, reference is now made to the drawing depicting the side view of one embodiment of the apparatus of my invention. The drawing also indicates how an existing single-vessel regeneration apparatus of the type in common use at the present time might be modified to construct the apparatus of my invention.

While the invention will be described in connection with a preferred embodiment, it will be understood that it is not intended to limit the invention to that embodiment. On the contrary, it is intended to cover all alternatives, modifications and equivalents as may be included within the spirit and scope of the appended claims. It will also be understood that the drawing is only shown in such detail as is necessary for an understanding of the invention and that various items such as minor valves, bleed and dispersion steam lines, expansion joints, instrumentation and other control means have been omitted for the sake of simplicity.

The drawing shows the side view of the apparatus of my invention which apparatus basically comprises a spent-catalyst receiving chamber 1, a regenerated-catalyst receiving chamber 2, a transfer conduit 3, and internal regenerated-catalyst recycle means consisting of a conduit 34 and catalyst collecting means 35.

Spent-catalyst receiving chamber 1, shown in the lower left region of the drawing, has a dense-phase fluidized bed of catalyst 4, having a level or interface 8, maintained within the chamber. Attached to spent-catalyst receiving chamber 1 are shown spent-catalyst inlet means 7 and fresh-regeneration-gas inlet means 10. Spent catalyst from a hydrocarbon reaction zone (not shown) is continuously introduced to the dense bed 4 via spent-catalyst inlet means 7. A controlled stream of fresh regeneration gas in an amount to produce an excess of oxygen over the amount required for essentially complete combustion of the coke on the catalyst and of the carbon monoxide is continuously introduced via fresh-regeneration-gas inlet means 10 into bed 4 through distributing means 11 which means allows the fresh regeneration gas to be more readily dispersed within the dense bed 4. I have found that all of the fresh regeneration gas required for essentially complete coke and CO combustion can be added in this manner to the spent catalyst receiving chamber. There need be no other inlet means for fresh regeneration gas into the apparatus. Typically distributing means 11 can be a metal plate containing holes or slots or preferably a pipe-grid arrangement, both types of which are familiar to those skilled in the art. Oxidation of the carbonaceous deposits on the spent catalyst takes place in dense bed 4 to produce partially spent regeneration gas and regenerated catalyst both of which pass out of chamber 1 in admixture through regenerated-catalyst/regeneration-gas outlet means 9, located at the top of chamber 1, and into transfer conduit 3 wherein CO oxidation takes place to produce spent regeneration gas and where the heat of combustion of the carbon monoxide to carbon dioxide is transferred to the catalyst being transported.

Transfer conduit 3 has a substantially vertical portion 3A and a substantially horizontal portion 3B joined at a substantially right angle and has an interior volume 3C. Substantially vertical portion 3A has an inlet 9 at its lower end which is connected to the regenerated catalyst/regeneration-gas outlet means of chamber 1. The inlet of transfer conduit 3 is labeled 9 as is the regenerated-catalyst/regeneration-gas outlet means since they are in communication with each other.

The mixture of regeneration gas and regenerated catalyst passing through portion 3A of transfer conduit 3 is directed by the substantially right angle to substantially horizontal section 3B of transfer conduit 3. The substantially horizontal portion 3B extends into the side of regenerated-catalyst receiving chamber 2 and has an outlet means 16 which may comprise single or multiple openings located within chamber 2 to allow catalyst and regeneration gas to pass out of the transfer conduit 3.

Cap 3D is located at the upper end of the vertical portion 3A and is so positioned that a certain volume of the vertical portion is contained above the top of horizontal portion 3B. This section provides volume which can fill up with the catalyst and gas mixture thereby creating a cushion which prevents attrition in the upper end of the vertical portion when catalyst particles are directed from the vertical portion to the horizontal portion of the transfer conduit.

An internal regenerated-catalyst recycle means consisting of a catalyst collecting means 35 and a conduit 34 is shown positioned in portion 3A of transfer conduit 3 and in spent-catalyst receiving chamber 1. Catalyst collecting means 35 is positioned in the upper part of portion 3A near the junction of portion 3A and portion 3B of transfer conduit 3. Conduit 34 extends downward through portion 3A of transfer conduit 3 and into the dense-phase bed of catalyst 4 within spent catalyst receiving chamber 1. Catalyst collecting means 35 has a catlyst inlet means 36 and a catalyst outlet means 37 while conduit 34 has an inlet means 37 and an outlet means 38. The catalyst outlet means 37 of collecting means 35 is attached to inlet means 37 of conduit 34 so both are indicated by the same number. A portion of the hot regenerated catalyst passing through portion 3A and entering portion 3B of transfer conduit 3 falls into the catalyst inlet means 36 of collecting means 35 and passes downward through the catalyst collecting means 35 and conduit 34 into dense bed 4 within spent catalyst receiving chamber 1. The internal regenerated-catalyst recycle means provides a continuous return of a portion of the hot regenerated catalyst from the transfer conduit 3 to the dense-phase bed of catalyst 4 where coke oxidation takes place thereby increasing the density and the temperature of the dense bed 4.

Regenerated-catalyst receiving chamber 2, containing a dilute phase disengaging space 17 in the upper portion of the chamber wherein cyclone separation means are located and containing a dense bed of regenerated catalyst 5 having a level or interface located at 26 in the lower portion of the chamber will be recognized by those skilled in the art as very similar to the single-vessel regeneration apparatus now commonly used for catalyst regeneration. The drawing indicates that the apparatus of my invention can be constructed by modifying that vessel into a regenerated-catalyst receiving chamber and by adding a new spent-catalyst receiving chamber, transfer conduit and regenerated-catalyst recycle means.

The substantially horizontal portion 3B of conduit 3 extends into disengaging space 17 and the transfer conduit outlet means 16 is located within chamber 2 above interface 26 of dense bed 5. Outlet means 16 will be connected to or in communication with a separation means whereby catalyst and regeneration gas passing out of conduit 3 can be separated. Separation means which can be employed shall include: a disengaging space by itself in which separation of regenerated catalyst and spent regeneration gas takes place by a sudden decrease in velocity of the mixture of catalyst and gas leaving outlet means 16; cyclone separation means arranged in parallel or series flow arrangements to achieve the desired degree of separation; or, combinations of a disengaging space and cyclone separation means. In the embodiment indicated in the drawing the separation means is a combination of disengaging space 17 and cyclone separation means 19 and 23 which combination is effectively used to achieve the desired degree of separation. Regenerated catalyst and spent regeneration gas pass out of the transfer conduit 3 through outlet means 16 and into disengaging space 17 where some separation of catalyst and gas occurs by the sudden decrease in the velocity of the mixture. Baffle plate 18 directs the flow of catalyst and gas in a generally downward direction within the vessel. Spent regeneration gas and entrained catalyst pass from disengaging space 17 into cyclone separation means 19, through inlet 20. Spent regeneration gas substantially free of catalyst passes out of cyclone separation means 19 through outlet conduit 22 while separated catalyst passes through dipleg 21 directed downward toward dense bed 5. Outlet conduit 22 directs separated spent regeneration gas containing small amounts of entrained spent catalyst from cyclone separation means 19 into another cyclone separation means 23. Spent regeneration gas is again separated from catalyst with the spent regeneration gas passing out of cyclone separation means 23 and out of vessel 2 via spent regeneration gas outlet means 24 while catalyst passes through dipleg 25 directed downward toward dense bed 5 which has a level or interface at 26.

The preferred separation means described above permits the cyclone separation means in an existing regeneration vessel to remain in essentially their original position thus simplifying the modification required to convert such an existing regeneration vessel into the regenerated-catalyst receiving chamber of my apparatus. Alternatively, with additional modification, inlet 20 of cyclone separation means 19 could of course be attached directly to outlet means 16 of transfer conduit 3 for quick positive separation of regenerated catalyst from spent regeneration gas.

Regenerated catalyst will leave dense bed 5 in regenerated-catalyst receiving chamber 2 through outlet means 32 and be returned to the hydrocarbon reaction zone where the catalyst will again become contaiminated with coke. As indicated in the drawing, an optional regenerated-catalyst stripper 27 may be located in the lower portion of chamber 2 to allow stripping of interstitial and adsorbed regeneration gas from the regenerated catalyst prior to its being returned to the hydrocarbon reaction zone. Stripper 27 is not, however, necessary for the operation of my apparatus. When stripper 27 is employed regenerated catalyst would pass downward over baffles 28 and would be counter-currently stripped by a stripping medium which enters the bottom of stripper 27 through inlet means 29. Generally the stripping medium would be steam. Stripped regenerated catalyst would then leave stripper 27 and regenerated-catalyst receiving chamber 2 and pass to the hydrocarbon reaction zone via outlet means 32. When regenerated catalyst is not to be stripped baffles 28 and stripping medium inlet means 29 will usually be eliminated from the apparatus. Control means 33 will typically be located on outlet means 32 to control the rate of withdrawal of regenerated catalyst. Typically control means 33 will be a slide valve which is operated by a reaction-zone temperature or level controller.

DESCRIPTION OF THE INVENTION

At the outset the definitions of various terms will be useful in making clear the operation, objects and advantages of the apparatus of my invention as herein described.

The term "spent catalyst" as used in the claims and specification shall mean catalyst withdrawn from a hydrocarbon reaction zone because of reduced activity caused by coke deposits. Spent catalyst can obtain anywhere from a few tenths up to about 5 wt. % coke but typically in FCC operations spent catalyst will contain from about 0.5 to about 1.5 wt. % coke.

The term "regenerated catalyst" as used herein shall mean catalyst from which coke has been removed by oxidation in a regeneration apparatus. Regenerated catalyst produced by the apparatus of my invention will typically contain from about 0.01 to about 0.2 wt. % coke and more specifically from about 0.01 to about 0.1 wt. % coke.

The term "regeneration gas" shall mean, in a generic sense, any gas which is to contact catalyst or which has contacted catalyst within the regeneration apparatus. Specifically the term "fresh regeneration gas" shall include oxygen-containing gases such as air or oxygen-enriched or deficent air which pass into the regeneration apparatus to allow oxidation of coke on the spent catalyst. "Partially spent regeneration gas" shall refer to regeneration gas which has contacted catalyst within the spent-catalyst receiving chamber (hereinafter described) and which contains a reduced quantity of free oxygen as compared to fresh regeneration gas. Typically the partially spent regeneration gas contains water, nitrogen, oxygen, carbon monoxide, and carbon dioxide. Depending upon the operating conditions employed within the catalyst regeneration apparatus, particularly the amount of oxygen-containing regeneration gas passed into the apparatus, the concentrations of CO in partially spent regeneration gas can vary over a wide range of from about a few thousand parts per million up to about 15 vol. % or more and the concentration of $CO_2$ can vary from about 5 vol. % to about 20 vol. %.

The term "essentially complete combustion of CO" as used herein shall mean that the CO content of the regeneration gas leaving the regeneration apparatus has been reduced to and maintained at a concentration of less than about 2000 ppm. and generally less than about 500 ppm. by the proper selection of operating conditions. "Spent regeneration gas" therefore shall mean regeneration gas leaving the regeneration apparatus which contains less than about 2000 ppm. carbon monoxide, carbon dioxide nitrogen, water and from about a few tenths up to as much as 15 mole % free oxygen. More preferably spent regeneration gas will contain less than about 1000 ppm. CO, and even more preferably less than about 500 ppm. CO.

The terms "dense-phase" and "dilute-phase" are commonly-used terms in the art of fluidized solids and particularly in the art of fluid catalytic cracking to generally characterize catalyst densities in various parts of the process vessels or apparatus. While the demarkation density is somewhat ill-defined, as the term "dense-phase" is used herein it shall refer to regions within the catalyst regeneration apparatus where the catalyst density is greater than about 5 lb/ft$^3$ and as "dilute-phase" is used herein it refers to regions where the catalyst density is less than about 5 lb/ft$^3$. Usually the dense-phase density will be in the range of from about 5 to 35 lb/ft$^3$ or more and the dilute-phase density will be much less than 5 lb/ft$^3$ and in the range of from about 0.1 to about 5 lb/ft$^3$. Catalyst densitites within regeneration apparatus are commonly measured by measuring pressure or head differences across pressure taps installed in the apparatus and spaced at known distances apart.

The basic components of the regeneration apparatus of my invention, hereinafter described in more detail, are briefly defined as follows. The term "spent-catalyst receiving chamber" shall mean a chamber for containing a dense-phase fluidized bed of catalyst wherein the majority of coke is oxidized. The term "transfer conduit" as used herein shall mean a conduit in which CO conversion takes place in the presence of dilute-phase fluidized catalyst to produce spent regeneration gas and in which at least a portion of the heat of combustion is transferred to the catalyst. The term "regenerated-catalyst receiving chamber" shall mean a chamber for separating regenerated catalyst and spent regeneration gas and for containing a dense-phase bed of regenerated catalyst. The term "internal regenerated-catalyst recycle means" shall mean that component of the regeneration apparatus by which a portion of hot regenerated catalyst from the transfer conduit is recycled from the transfer conduit to the dense bed of catalyst within the spent-catalyst receiving chamber. The regenerated-catalyst recycle means is described as "internal" because no portion of the recycle means is outside of the regeneration apparatus.

In regeneration apparatus now most frequently used in fluid catalytic cracking processes CO resulting from the oxidation of coke is not essentially completely oxidized to $CO_2$. Spent catalyst is introduced into the regeneration apparatus wherein catalyst is maintained in a dense bed for average catalyst residence times of two minutes or more by limiting the superficial velocity of the incoming fresh regeneration gas. Coke is oxidized to produce regenerated catalyst and partially spent regeneration gas which are directed out of the regeneration apparatus. Regenerated catalyst produced by present processes is neither stripped of adsorbed and interstitial regeneration gas nor recycled for any purpose within the regeneration apparatus.

More specifically, in a presently-used prior art regeneration apparatus, the amount of fresh regeneration gas admitted to the apparatus is controlled by a predetermined temperature differential between the gas outlet section of the regeneration apparatus and either the dense-bed temperature or a dilute-phase temperature within the apparatus. Such control scheme minimizes excess oxygen and thus prevents essentially complete CO combustion. Since combustion of CO is not complete, temperatures within the regeneration apparatus will generally not be higher than about 1275° F. with the usual range being from about 1150° F. to about 1250° F. When such a control scheme is used, the amount of residual coke left on regenerated catalyst is largely a function of regeneration apparatus design, that is, how well gas and solids are mixed, the number of stages used, the residence time and the resulting temperature. Typically regenerated catalyst will contain less than about 0.5 wt. % coke and usually from about 0.15 to about 0.35 wt. % coke while spent catalyst entering the regeneration apparatus generally contains from about 0.5 to 1.5 wt. % coke. Partially spent regeneration gas is separated from entrained regenerated catalyst by cyclone separation means located within the regeneration apparatus and separated gas containing CO is passed from the regeneration apparatus either directly to the atmosphere or to a carbon monoxide boiler where the chemical heat of carbon monoxide is recovered externally to the regeneration apparatus by combustion as a fuel for the production of steam. Separated regenerated catalyst is returned to the bottom portion of the regeneration apparatus and regenerated catalyst then leaves the apparatus, with no prior stripping of regeneration gas, and contacts the feed stock in a hydrocarbon reaction zone.

In a typical regeneration apparatus the spent catalyst is maintained in the bottom portion of the apparatus in one or more dense beds by limiting the superficial velocity of the incoming fresh regeneration gas. The superficial velocity is limited to the transport velocity, that is, the velocity above which large amounts of catalyst would be carried out of the dense bed to the cyclones. Typical velocities are therefore less than about 3 feet per second with about 1.5 to about 2.5 being the usual range.

It is this limit on superficial velocity which produces the rather large catalyst inventories found in conventional regeneration apparatus. The determination of the inventory in a typical regeneration apparatus is based upon the feed rate to the FCC process (or more specifically to the coke yield from that feed rate) and the superficial velocity in the regeneration apparatus. This coke yield anticipated from a desired feed rate determines the rate of the fresh regeneration gas to the regeneration apparatus. This gas rate at a limiting superficial velocity then determines the cross-sectional area of the regeneration apparatus. With a known catalyst density and height of the dense bed the inventory of the regeneration apparatus, and for practical purposes for the FCC process, is fixed. Catalyst residence times which result are generally from about 2 to 5 minutes with about 2 to 3 being the general range. Since catalyst makeup rates required to make up losses and maintain catalyst activity tend to be a percentage of the total catalyst inventory, these rates for FCC processes with conventional regenerators are rather high.

Thus the typical regeneration apparatus as presently designed and operated has these disadvantages: no provision is made for the essentially complete conversion of CO to $CO_2$ within the apparatus and a CO disposal problem thus arises; with CO conversion essentailly precluded, the coke oxidation temperature cannot be increased without burning external torch oil within the apparatus or increasing the amount of coke on spent catalyst; a portion of the catalyst activity has not been recovered because the regenerated catalyst produced still contains significant amounts of residual coke; and, catalyst inventories tend to be rather large.

In the apparatus of my invention coke from spent catalyst can be efficiently oxidized to produce regenerated catalyst having very low residual coke levels, CO produced can be essentially completely converted to $CO_2$, and at least a portion of the heat of combustion can be recovered and used within the apparatus. More specifically, efficient oxidation is achieved by employing superficial velocites higher than the critical velocity and by recycling a portion of hot regenerated catalyst from the transfer conduit back to the spent-catalyst receiving chamber where coke oxidation occurs thereby increasing the rate and extent of coke oxidation.

Spent catalyst and regeneration gas are passed through their respective inlet means into a spent-catalyst receiving chamber containing a dense bed of fluidized catalyst and coke is oxidized at coke oxidation conditions to produce regenerated catalyst and partially spent regeneration gas. Typical coke oxidation conditions include a catalyst residence time of less than about 2 minutes, a regeneration gas residence time of less than about 10 seconds, a temperature from about 1250° F. to about 1400° F., a superficial regeneration gas velocity of from about 3 to about 10 feet per second and a pressure from about atmospheric to about 50 psig. Essentially all of the coke oxidation takes place within the spent-caytalyst receiving chamber but because of the short regeneration-gas residence time conversion of CO to $CO_2$ within this chamber is not complete. Regeneration gas and regenerated catalyst are transported from the spent-catalyst receiving chamber through a regenerated-catalyst/ regeneration-gas outlet means into a transfer conduit where at CO conversion conditions essentially complete CO oxidation takes place and where at least a portion of the heat of combustion of the CO is transferred to the catalyst. Typical CO conversion conditions within the transfer conduit include a temperature from about 1275° F. to about 1425° F., a pressure from about atmospheric to about 50 psig, and a superficial gas velocity of from about 10 to about 25 feet per second. No other combustible fluid other than CO need be oxidized within the transfer conduit because a sufficient portion of the heat of combustion of CO will be transferred to the catalyst within the transfer conduit to achieve a regenerated catalyst temperataure within a desired range of from about 1250° F to about 1325° F. Regenerated catalyst temperatures higher than about 1325° F. tend to cause excessive amounts of thermal cracking when mixed with the feed stock in the hydrocarbon reaction zone and are therefore to be avoided. The addition of combustible fluids such as fuel gas, feed stock, or torch oil to and the combustion of such fluids within the transfer conduit is therefore not necessary and indeed may be harmful to the product yields obtained from the FCC process. A portion of hot regenerated catalyst is recycled via the regenerated-catalyst recycle means from the transfer conduit to the dense bed of catalyst in the spent-catalyst receiving chamber to increase the density and the temperature within the chamber thereby increasing both the rate and extent of coke oxidation and indirectly increasing the rate of CO oxidation in the transfer conduit. Regenerated catalyst and spent regeneration gas leaving the transfer conduit pass into the regenerated-catalyst receiving chamber and are separated by separation means located within the regenerated-catalyst receiving chamber. Separated regenerated catalyst passes to a dense bed of catalyst in the bottom portion of the regenerated-catalyst receiving chamer and spent regeneration gas passes out of the chamber and out of the regeneration apparatus through spent regeneration gas outlet means. Regenerated catalyst is returned from the dense bed of catalyst in the regenerated-catalyst receiving chamber to the hydrocarbon reaction zone through a regenerated-catalyst outlet means. Regenerated catalyst may be optionally stripped of adsorbed and interstitial regeneration gas in a regenerated catalyst stripper.

It is well known in the art that the level of residual coke on the regenerated catalyst has a great influence on the conversion and product yield distribution obtained in the reaction zone, especially when coke-sensitive zeolite-containing catalysts are employed in the short contact time, dilute-phase hydrocarbon reaction zones. The apparatus of my invention makes it possible not only to produce regenerated catalyst having lower residual coke and therefore higher activity but also to eliminate the problem of CO pollution without requiring a CO boiler and to recover within the apparatus at least a portion of the heat of CO combustion for advantageous uses within the apparatus and the FCC process. More specifically, at least a portion of the heat of CO combustion is recovered by the regenerated catalyst thereby producing hotter regenerated catalyst than is produced in non-CO-burning catalyst regeneration apparatus. The recycle of a portion of hot regenerated catalyst back to the spent-catalyst receiving chamber increases the rate of coke oxidation and CO conversion thereby making smaller equipment possible. The return to the hydrocarbon reaction zone of regenerated catalyst at a temperataure higher than that usually obtained in a non-CO-burning regeneration apparatus allows possible reduction in feed preheat requirements.

Dramatic catalyst inventory reductions are possible by the apparatus of my invention. As previously described, inventories in regeneration apparatus are directly related to superficial velocities employed within the regeneration apparatus. Since it is not intended in the apparatus of my invention that catalyst in the spent-catalyst receiving chamber remain in that chamber the superficial velocity of the fresh regeneration gas into the chamber is not limited to the critical velocity. Superficial velocities in the spent-catalyst receiving chamber will be in the range of about 3 to 10 feet per second so that catalyst can be carried from the chamber into the transfer conduit. With superficial velicites now 2 to 3 times the critical velocity, catalyst inventories using the apparatus of this invention will be about 40 to 60 percent of those in present regeneration apparatus. As an example, a moderately sized FCC process of the type presently in industry use will contain about 150 tons of catalyst. By using the regeneration apparatus of this invention in an FCC process of the same size, a refiner could save the initial investment represented by at least 75 tons of catalyst. Catalyst makeup rates required to make up losses and maintain activity will also be reduced with my apparatus since such rates tend to be a percentage of the total catalyst inventory.

Because of the combination of higher temperatures which result from the recycle of hot regenerated catalyst, better gas-solid contact due to the higher velocities now permitted, higher oxygen partial pressures, and increased density of the dense-phase catalyst bed, the rate of coke combustion in the apparatus of my invention will be increased. Once-through catalyst residence times can be reduced from the present 2 to 5 minutes found in conventional regeneration apparatus operating at low superficial gas velocities to less than about 2 minutes in the coke oxidation portion of my regeneration apparatus.

Besides permitting smaller equipment size another important result of shorter catalyst residence time is that it may allow the steam stripping of flue gas components from the regenerated catalyst. In spite of the fact that flue gas components are entrained by regenerated catalyst into the reaction zone and hence become part of a product stream, steam stripping of regenerated catalyst has generally not been practiced because of the longer catalyst residence times in conventional regeneration apparatus and because the entire catalyst inventory is generally maintained in a single dense bed within the apparatus. Exposure of this quantity of catalyst to steam for this longer period of time would increase the catalyst deactivation rate. The shorter catalyst residence time in this apparatus however may now permit steam stripping.

Thus the apparatus of my invention overcomes the disadvantages of the prior art regeneration apparatus. With the apparatus of my invention, provision is made for the essentially complete conversion of CO to $CO_2$ within the apparatus thus eliminating a CO disposal problem without the need for a CO boiler; coke oxidation temperature can be increased without burning external torch oil within the apparatus or increasing the amount of coke on spent catalyst or employing a fresh regenration gas preheater; the regenerated catalyst produced contains very low amounts of residual coke and thus has higher activity, and catalyst inventories and makeup rates can be reduced.

Spent catalyst inlet means and fresh-regeneration gas inlet means are connected to the spent-catalyst receiving chamber to carry the spent catalyst from the hydrocarbon reaction zone and fresh regeneration gas into the chamber. Generally these inlet means are conduits which typically may contain distribution devices located on the outlets within the chamber to allow distribution of spent catalyst and fresh regeneration gas within the dense bed of catalyst contained within the chamber in order to promote efficient oxidation of coke from the catalyst. Preferably, the fresh regeneration gas inlet is connected to or passes through a grid located in the lower portion of the chamber to allow distribution of fresh regeneration gas within the dense bed. Although coke oxidation and essentially complete conversion of CO occur in separate portions of the apparatus, all of the fresh regeneration gas required for both operations can be passed into the apparatus through the fresh regeneration gas inlet means connected to the spent-catalyst receiving chamber since catalyst and regeneration gas pass in series through the spent-catalyst receiving chamber and the transfer conduit. A regenerated-catalyst/regeneration-gas outlet means is located at the upper portion of the chamber and specifically at the top of the chamber to allow passage of regenerated catalyst and regeneration gas in admixture from the chamber.

The regenerated-catalyst/regeneration-gas outlet means is connected to the inlet of the transfer conduit which is a cylindrical vessel through which regenerated catalyst and regeneration gas pass in admixture and in which CO is essentially completely converted to $CO_2$ to produce spent regeneration gas with at least part of the heat of combustion being transferred to the regenerated catalyst. The cross-sectional area of the transfer conduit will be much smaller than that of the spent-catalyst receiving chamber so that superficial gas velocities within the conduit will be within the range of from about 10 to about 25 feet per second.

As noted previously, this transfer conduit will have a substantially vertical portion and a substantially horizontal portion joined together at a substantially right angle. This substantially horizontal portion of the transfer conduit is connected to and extends into the side of the regenerated-catalyst receiving chamber and has an outlet means located within the chamber. The primary reason for the transfer conduit having both substantially vertical and substantially horizontal portions and the reason for the horizontal portion into the side is so that existing single-vessel regeneration apparatus can be used, without having to be relocated from their existing position, as the regenerated-catalyst receiving chamber of my invention. Being able to utilize existing single-vessel regeneration apparatus in its original position permits savings in construction costs. So positioned in this manner, the two chambers will be adjacent to each other.

The apparatus will have contained within it an internal regenerated-catalyst recycle means by which a portion of hot regenerated catalyst can be continuously returned from the transfer conduit to the dense-phase bed of catalyst in the spent-catalyst receiving chamber thereby increasing the temperature and density of the dense bed. The internal regenerated-catalyst recycle means will generally be designed to recycle regenerated catalyst in an amount equal to about 2 to about 200% and more preferably from about 25% to about 100% of the spent catalyst entering the spent-catalyst receiving chamber. Preferably the recycle means will comprise a conduit, having a conduit inlet means and a conduit outlet means, and a catalyst collecting means having a catalyst inlet means and a catalyst outlet means which will be connected to the conduit inlet means. The catalyst collecting means will be positioned in the vertical portion of the transfer conduit at or near the junction of the vertical portion and the horizontal portion of the transfer conduit and the conduit will extend vertically downward into the spent-catalyst receiving chamber with the conduit outlet means located in the spent-catalyst receiving chamber. Typically the recycle means would be supported by attachment means only to the inside wall of the vertical portion of the transfer conduit so that the lower portion of the recycle means would be free to move with expansion and contraction of the regeneration apparatus. For reliability and to avoid any maintenance which would necessitate a shutdown of the regeneration apparatus the internal regenerated-catalyst recycle means will typically be designed with no moving parts such as flow control means. The recycle of hot regenerated catalyst serves to increase the temperature in the spent-catalyst receiving chamber thereby increasing both the rate of reaction and the extent of coke oxidation.

The outlet of the transfer conduit will be connected to a separation means within the regenerated-catalyst receiving chamber provided to separate regenerated catalyst and spent regeneration gas passing from the transfer conduit. Such separation means may comprise: a disengaging chamber by itself in which separation is effected by a sudden decrease in superficial velocity of the gas-catalyst mixture exiting the transfer conduit into the chamber; one or more cyclone separation means comprising parallel or series flow arrangements of cyclone separation devices to effect the desired degree of separation; or combinations of a disengaging space and cyclone separation means. In the preferred embodiment, the separation means will comprise a combination of a disengaging space and cyclone separation means. Initial separation will take place by a sudden decrease in velocity as the catalyst-fluid mixture exits from the transfer conduit into the disengaging space. Additional separation is then achieved by the cyclone separation means. This arrangement is preferred so that the cyclone separation means in the existing single-vessel regeneration apparatus can be used without relocation.

Separated regenerated catalyst is directed downward toward a dense bed of regenerated catalyst located in the lower portion of the regenerated-catalyst receiving chamber. Regenerated-catalyst outlet means and spent-regeneration-gas outlet means are connected to this chamber at the lower and upper portions respectively to carry regenerated catalyst from the chamber to the hydrocarbon reaction zone and spent regeneration gas from the chamber respectively. Typically, these means are conduits which may have flow control means such as slide valves located thereon to control the flow of catalyst or gas.

The regenerated-catalyst receiving chamber may optionally have located in the lower portion thereof a regenerated-catalyst stripper to strip regenerated catalyst of adsorbed and interstitial regeneration gas prior to return of the catalyst from the chamber to the reaction zone. Such a stripper would typically be concentric with the chamber and would contain baffles over which regenerated catalyst from the dense bed would flow in a downward direction against an upward flow of stripping medium which would generally be steam. An existing single-vessel regeneration apparatus, which is intended to be incorporated into my apparatus and adopted for use as a regenerated-catalyst receiving chamber, could relatively easily be fitted with such a catalyst stripper.

Materials of construction for building the apparatus of my invention shall be material which are able to withstand the abrasive conditions inherent in the fluidized-catalyst apparatus and which are able to withstand the high temperatures involved. Specifically, metals such as carbon steel and stainless steel which may or may not be lined with abrasion-resistant refractory linings are contemplated. The spent-catalyst receiving chamber transfer conduit and regenerated catalyst receiving chamber should be so designed and constructed to withstand sustained operating temperatures of from about 1250° to about 1450° F. and temperatures above about 1450° F. for short periods of time of up to about 8 hours. The entire apparatus should also be designed for normal operating pressures of from about atmospheric up to about 50 psig.

I claim as my invention:

1. An apparatus for oxidizing coke on spent catalyst which comprises in combination:
   a. a spent-catalyst receiving chamber for containing a dense-phase fluidized bed of catalyst having a spent catalyst inlet means and a fresh-regeneration gas inlet means connected thereto to allow passage of spent catalyst and fresh regeneration gas respectively into said chamber and having a regenerated-catalyst/regeneration-gas outlet means connected thereto to allow passage of regenerated catalyst and regeneration gas from said chamber;
   b. a transfer conduit positioned above said spent-catalyst receiving chamber and having a substantially vertical portion and a substantially horizontal portion in interconnection with said vertical portion, said vertical portion extending above said horizontal portion and having an inlet connected to the regenerated-catalyst/regeneration-gas outlet means and said horizontal portion extending into the side of a hereinafter described regenerated-catalyst receiving chamber and being provided with an outlet means into said chamber whereby regenerated catalyst and regeneration gas are carried from said spent-catalyst receiving chamber in admixture to said regenerated-catalyst receiving chamber, said portions of said transfer conduit being of sufficient internal volume to permit CO oxidation and transfer of the heat of combustion to said catalyst therein;

c. an internal regenerated-catalyst recycle means, having an inlet means in the transfer conduit and an outlet means in the spent-catalyst receiving chamber, to allow passage of a portion of regenerated catalyst from the transfer conduit to the spent-catalyst receiving chamber; and, d. a regenerated-catalyst receiving chamber for containing a dense-phase bed of regenerated catalyst, said chamber having a regenerated-catalyst outlet means and a spent-regeneration-gas outlet means connected thereto to allow passage of regenerated catalyst and spent regeneration gas from said chamber.

2. The apparatus of claim 1 further characterized in that said outlet of said transfer conduit is in communication with a disengaging space provided to separate catalyst and regeneration gas passing through said conduit.

3. The apparatus of claim 1 further characterized in that said internal regenerated-catalyst recycle means comprises a conduit and a catalyst collecting means.

4. An apparatus for oxidizing coke on spent catalyst which comprises in combination:

a. a spent-catalyst receiving chamber for containing a dense-phase fluidized bed of catalyst, said chamber having upper and lower sections, a fresh-regeneration-gas inlet means connected to said chamber at said lower section to allow passage of fresh regeneration gas into said chamber through said lower section, a spent-catalyst inlet means connected to said chamber to allow passage of spent catalyst into said chamber, and a regenerated-catalyst/regeneration-gas outlet means at the upper section of said chamber to allow passage of regenerated catalyst and regeneration gas in admixture from said chamber;

b. a transfer conduit positioned above said spent catalyst receiving chamber and having a substantially vertical portion and a substantially horizontal portion in interconnection with said vertical portion, said vertical portion extending above said horizontal portion and having an inlet for regenerated catalyst and regeneration gas connected to the regenerated-catalyst/regeneration-gas outlet means, said horizontal portion extending into the side of a hereinafter described regenerated-catalyst receiving chamber and having an outlet means within said chamber in communication with a disengaging space whereby regenerated catalyst and regeneration-gas are carried in admixture from said spent-catalyst receiving chamber to said disengaging space, said portions of said transfer conduit being of sufficient internal volume to permit CO oxidation and transfer of the heat of combustion to said catalyst therein;

c. a vertically disposed internal regenerated-catalyst recycle means comprising: a catalyst collected means, located in the substantially vertical portion of the transfer conduit and having catalyst inlet means and catalyst outlet means; and, a downwardly extending conduit, having an inlet means attached to the outlet means of said collecting means and an outlet means located within the spent-catalyst receiving chamber, to allow passage of a portion of the regenerated catalyst from the transfer conduit to the spent-catalyst receiving chamber; and, d. a regeneration-catalyst receiving chamber for containing a dense-phase bed of regenerated catalyst, said regenerated-catalyst receiving chamber having upper and lower sections, a spent-regeneration-gas outlet means connected to said chamber at its upper section to allow passage of spent regeneration gas from said chamber, and a regenerated-catalyst outlet means connected to said chamber at its lower section to allow passage of regenerated catalyst from said chamber.

* * * * *